Oct. 13, 1942.  S. ABBOTT  2,298,634
ANIMAL TRAP
Filed Feb. 10, 1941
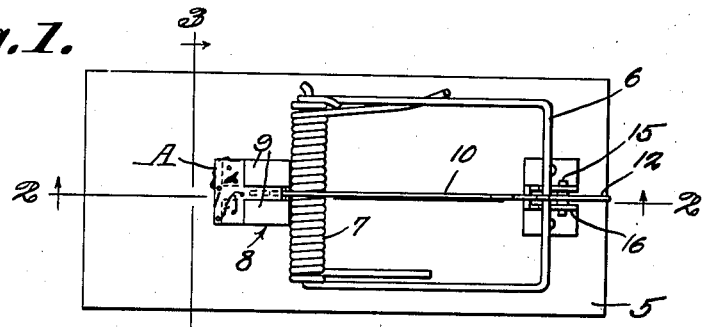
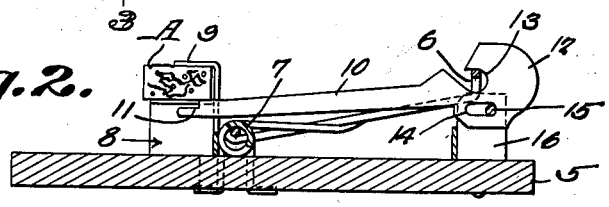
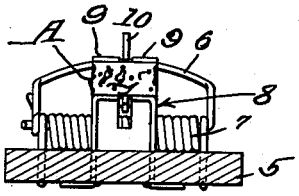
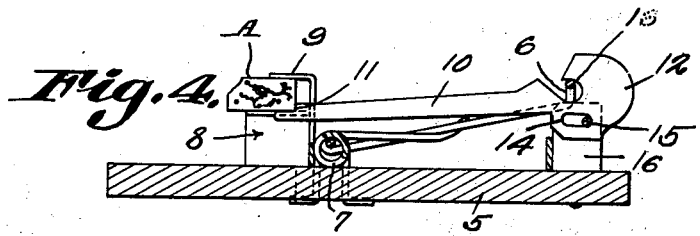
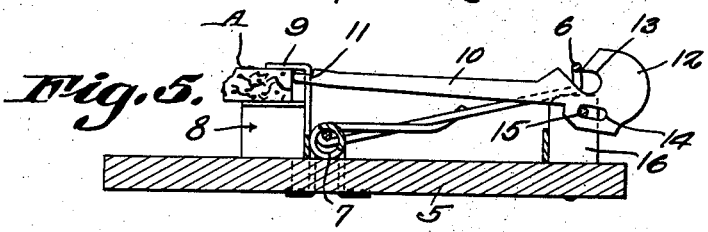
Stanton Abbott
INVENTOR.
BY *[signature]*
ATTORNEYS.

Patented Oct. 13, 1942

2,298,634

UNITED STATES PATENT OFFICE 2,298,634

ANIMAL TRAP

Stanton Abbott, Holmesville, Nebr.

Application February 10, 1941, Serial No. 378,273

4 Claims. (Cl. 43—81)

This invention relates to mouse, rat or animal traps of the spring-jaw type, an important object of the invention being to provide a spring-jaw trap which will hold the bait in such a way that slight movement of the bait, will release the spring-jaw of the trap to operate the trap and catch the mouse or rat attempting to remove the bait.

Another important object of the invention is to provide a trap of this character which will be exceptionally sensitive, the construction of the trap being such that the bait will provide a stop against which the lever that holds the jaw of the trap in its set position, will be held in its active position.

Still another object of the invention is to provide a trap of this character including a lever held in its active position by an upward pressure directed thereto by the jaw held by the lever, the lever moving to release the jaw when the pivot point of the lever is shifted, due to the removal of the bait under which the free end of the lever is positioned, when the trap is set.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a plan view of a trap constructed in accordance with the invention, the trap being shown in its set position.

Figure 2 is a sectional view taken on line 2—2 of Figure 1, illustrating the free end of the lever as below the pivot point of the lever.

Figure 3 is a sectional view taken on line 3—3 of Figure 1.

Figure 4 is a sectional view taken longitudinally through the trap, illustrating the position of the free end of the lever with respect to the bait, when the bait has been partially removed by rodents attempting to obtain the bait.

Figure 5 is a sectional view similar to Figure 4, illustrating the bait as having been moved to release the lever.

Referring to the drawing in detail, the base of the trap is indicated by the reference character 5 and is preferably constructed of wood or other light material.

The spring-jaw is indicated by the reference character 6, and is secured to the base, at a point substantially intermediate the ends thereof, the spring 7 acting to move the jaw, over one end of the base, when the trap is actuated to catch a mouse or rat attempting to remove the bait therefrom.

The bait is held by the member 8, which is secured to the base, at a point adjacent to the spring 7 of the spring-jaw, as clearly shown by the drawing. The member 8 is in the form of a shelf and is formed with upwardly and forwardly extended fingers 9, the fingers overlying the shelf or main portion of the member 8, in spaced relation therewith, so that a block of cheese or similar bait may be forced between the shelf and fingers and held in position therebetween. The fingers are spaced apart, and the space between the fingers, extends centrally through the member 8, so that the free end of the lever 10, may move thereinto.

The lever 10, constitutes the setting lever of the trap, and is provided with an offset end portion 11 adapted to engage under one edge of the bait, which in the present showing is indicated at A, when the bait is moved slightly, as clearly shown by Figure 4 of the drawing. The lever 10 is formed with an enlarged end portion 12 formed with a curved hook-like portion 13 disposed in the upper edge thereof. An elongated opening indicated at 14 receives the pivot pin 15 that extends through the bracket 16 rising from the base 5.

The pin 15 provides the support for the lever 10, and since the opening 14 is elongated, it will be seen that my moving the lever 10 in one direction, the length of the lever between the pivot point and free end of the lever, will be shortened, to the end that only slight movement of the bait, will release the lever to release the jaw, operating the trap. When the trap is being set, the jaw 6 is moved to the position as shown by Figure 1, wherein the cross-bar at the free end of the jaw, moves into the curved hook-like portion 13 of the lever 10. The bait is now positioned under the fingers 9, and the free end of the lever 10 is permitted to move upwardly, contacting with the bottom of the bait, as shown by Figure 2 of the drawing. When the lever 10 is in this position, it will be noted that the bait-engaging end thereof is below the pivot point of the lever. Should the bait be moved slightly, as indicated by Figure 4 of the drawing, the offset portion 11 of the lever 10 will move to engage the forward edge of the block of bait, as shown by Figure 4. Slight movement of the bait from this position, will cause the lever 10 to move in a direction away from the bait, the pivot pin 15 taking the position at the forward end of the elongated opening, and allowing the lever to swing upwardly, under the pressure of the spring-jaw 6, whereupon the spring-jaw will move directly over the opposite end of the base 5, to catch the mouse or rat which has removed the bait.

Because the opening 14 is elongated, and since the spring-jaw moves against the curved surface 13 of the lever 10, it will be seen that upward pressure on the curved surface 13 will tend to move the lever rearwardly with respect to the pin 15, to the end that the slightest movement of the bait will release the spring-jaw to accomplish the purpose of the invention.

What is claimed is:

1. In an animal trap, a base, a spring-jaw mounted on the base, a bait support embodying a pair of spaced fingers, a bracket mounted on the base, a pivot pin supported on the bracket, and a pivoted lever mounted on the pivot pin, an enlargement formed at one end of the lever, said enlargement having a horizontally disposed elongated opening in which the pivot pin operates, a forwardly extended hook having a curved surface, forming a part of the enlargement, said spring-jaw adapted to engage within the hook when the pivot pin rests in the rear end of the elongated opening, the free end of the lever being disposed within the space between said fingers and adapted to rest against bait positioned under said fingers, holding the lever in its set position, and said lever adapted to slide rearwardly, when the bait is removed and the spring-jaw moves over the curved surface of said hook, releasing said spring-jaw.

2. In an animal trap, a base, a spring-jaw mounted on the base, a horizontal pivot pin mounted on the base, a lever having a hook formed at one end thereof and having a horizontally elongated opening in which the pivot pin operates, said spring-jaw adapted to engage under said hook securing the jaw in its set position, a bait holder comprising a shelf and spaced fingers overlying the shelf in spaced relation therewith and under which bait is held, said shelf having a central slot, the free end of the lever resting within the slot and engaging the bait forcing the bait into engagement with the fingers, and said lever adapted to move rearwardly and swing upwardly on its pivot, releasing said spring-jaw when the bait is removed and releasing said lever.

3. In an animal trap, a base, a spring-jaw mounted on the base, a horizontal pivot pin mounted on the base, and a lever having a hook formed at one end thereof and having a horizontal elongated opening in which the pivot pin operates, said spring-jaw adapted to engage under said hook securing the jaw in its set position, spaced fingers mounted on the base and under which bait is held, the free end of the lever resting within the space and engaging the bait, the edge of the free end of the lever contacting the bait, being in the same horizontal line with the pivot pin when the trap is set, and said hook adapted to tilt rearwardly releasing the jaw when the bait is removed from the fingers and the free end of the lever moves upwardly.

4. In an animal trap, a base, a spring-jaw mounted on the base, a bait support embodying a pair of spaced fingers, a pivoted lever having an enlarged end formed with a horizontally elongated opening, a pivot pin mounted within the opening, a forwardly extended hook having an inclined inner edge disposed directly above the elongated opening, and against which the spring-jaw engages, the free end of the arm adapted to move between the fingers and engage bait held under said fingers, and said arm adapted to move rearwardly and swing upwardly releasing the spring-jaw when the bait is removed from the bait support.

STANTON ABBOTT.